Aug. 19, 1924.

J. M. McG. BARR 1,505,366

COUNTING MECHANISM OF CALCULATING MACHINES

Filed Nov. 21, 1923

Inventor
J. M. McG. Barr
By Marks & Clerk Attys.

Patented Aug. 19, 1924.

1,505,366

UNITED STATES PATENT OFFICE.

JAMES MARK McGINNIS BARR, OF LONDON, ENGLAND.

COUNTING MECHANISM OF CALCULATING MACHINES.

Application filed November 21, 1923. Serial No. 676,136.

*To all whom it may concern:*

Be it known that I, JAMES MARK MC-GINNIS BARR, a citizen of the United States of America, and residing at 68 Victoria Street, London, S. W. 1, England, have invented certain new and useful Improvements in the Counting Mechanism of Calculating Machines, of which the following is a specification.

This invention relates to the counting mechanism of calculating machines, with particular reference to those in which the mechanisms are operated by the release of balls or the like in predetermined groups or numbers.

The object of the present invention is to devise a simple and effective means by which the balls may be released much more rapidly than with existing devices, while at the same time there will be no danger of the device overrunning or of failing to pass a ball or balls so that notwithstanding the rapidity of its action the device will possess that absolute accuracy which is an essential for an accurate and efficient calculator.

The invention consists in a counting mechanism for calculating machines of the kind referred to, in which the balls or the like are released by a rotary or rotatable helix.

The invention also consists in counting mechanism of the above character in which the helix is provided with an escapement and is adapted to be actuated by the weight of the balls or the like to be released.

The invention also consists in a counting mechanism for calculating machines of the kind referred to in which the balls or the like are released by a rotary or rotatable helix, the pitch of which is equal to the length of the total number of balls to be released at one time.

The invention also consists in the apparatus hereinafter described or indicated.

The accompanying drawings illustrate several modes of carrying out the invention.

Figures 1, 2:
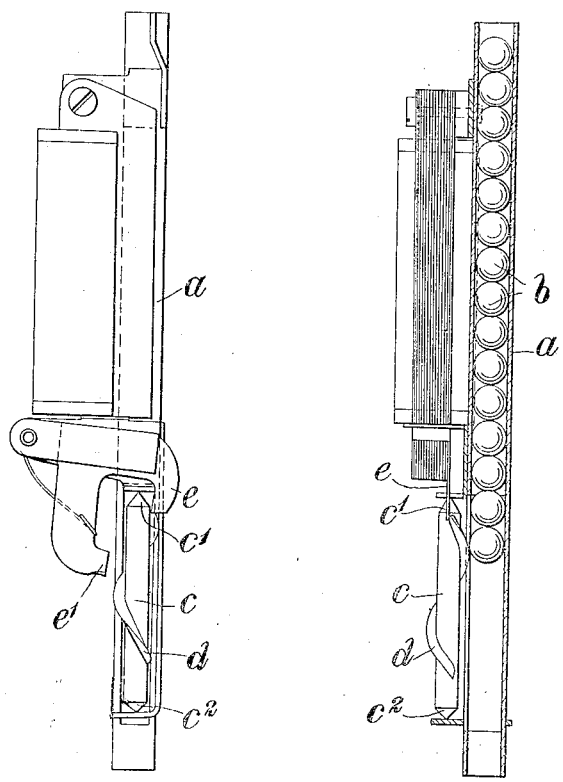
Figure 1 is a front elevation of one form of device in accordance with the invention.
Figure 2 is a section of Figure 1.

In carrying my invention into effect in one convenient manner, I provide a tube $a$ or reservoir for the balls $b$ or the like in the usual manner and in conjunction with each of such tubes or the like I provide a spindle $c$ which, if necessary or desirable, may be carried at each end by means of suitable centres $c'$, $c^2$ in order to minimize friction, and the spindle is formed with or carries a helical thread $d$ or web consisting of one complete helix, the pitch of which is equal to the length of the total number of balls to be released by the device at one time, such number being five in the case of the helix shown in Figures 1 and 2.

The spindle $c$ is held fixed by a suitable escapement $e$ of any convenient construction and controlled electro-magnetically or in any other suitable manner, the arrangement being such that when a group of balls is to be released the escapement releases the spindle and the weight of the balls above the helix causes rotation of the spindle, with the result that the group of balls located within the pitch of the helix will be released and suitable means, such as the projection $e'$, may be provided for preventing the overrunning of the device.

Figures 3, 4, 5:
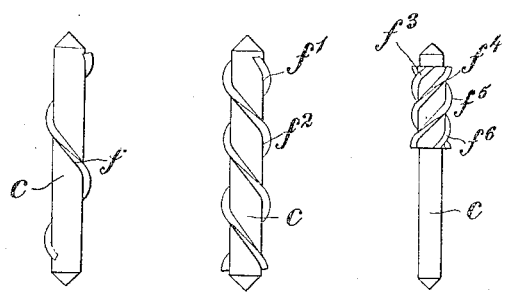
Figures 3, 4 and 5 are views illustrating modifications.

As above stated, the pitch of the helix will be determined by the number of balls to be released, and obviously I may provide multiple helices all of the same pitch in order to provide for the release of fractional numbers of balls; thus, for example, the helix $f$ (Figure 3) for the release of four balls will be made with a certain pitch and for the release of two balls a double helix $f'$ $f^2$ (Figure 4) of the same pitch may be employed, while for the release of one ball four such helices $f^3$, $f^4$, $f^5$ and $f^6$ (Figure 5) may be adopted.

It is to be understood, however, that the invention is not to be limited to any particular form or arrangement of helix nor to any particular means adopted for securing the rotation of the same, while the mode of arranging the releasing device in conjunction with the reservoir may be modified according to the kind of counter with which the arrangement is employed or any practical requirements that may have to be fulfilled.

Having now described my invention, what I claim as new and desire to secure by Letters Patent is:—

1. Means for releasing separate objects such as balls to the counting mechanism of a calculating machine comprising a reservoir for balls and a rotatable helix of which the pitch is equal to the length of the total number of balls to be released at one time, said helix being arranged in the path of the balls in the said reservoir.

2. Means for releasing separate objects such as balls to the counting mechanism of a calculating machine comprising a reservoir for balls, a rotatable helix adapted to support the weight of said balls and of a pitch equal to the length of the total number of balls to be released, an escapement adapted to hold the helix from rotation and means for releasing said escapement to permit of the helix rotating to release the balls.

3. Means for releasing separate objects such as balls to the counting mechanism of a calculating machine comprising a tube containing a number of balls, brackets on said tube, a helix projecting into said tube to support the balls above the helix and of such a pitch that a predetermined number of balls is released by the helix during one revolution, an escapement for preventing rotation of the helix and electro-magnetic means for releasing said escapement.

In testimony whereof I have signed my name to this specification.

JAMES MARK McGINNIS BARR.